(12) United States Patent
Gillis et al.

(10) Patent No.: US 7,395,931 B2
(45) Date of Patent: Jul. 8, 2008

(54) PROTECTIVE DEVICE FOR REDUCING THE IMPACT OF PHYSICAL SHOCK

(75) Inventors: Donald Ray Gillis, San Jose, CA (US); Norbert A. Feliss, Sunnyvale, CA (US); Andrei Khurshudov, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 211 days.

(21) Appl. No.: 10/727,853

(22) Filed: Dec. 3, 2003

(65) Prior Publication Data

US 2005/0121354 A1 Jun. 9, 2005

(51) Int. Cl.
*B65D 85/30* (2006.01)

(52) U.S. Cl. .................... 206/583; 206/806; 206/320; 206/591

(58) Field of Classification Search ............. 206/583 K, 206/594, 521, 320, 591, 305
See application file for complete search history.

(56) References Cited

U.S. PATENT DOCUMENTS

| | | | | |
|---|---|---|---|---|
| 1,798,779 A * | 3/1931 | Bowersock | ................. | 206/591 |
| 2,696,322 A * | 12/1954 | Densen | ......................... | 217/52 |
| 4,150,406 A | 4/1979 | Stollorz | ........................ | 360/97 |
| 4,384,750 A | 5/1983 | Hager | ........................... | 312/8 |
| 5,149,048 A | 9/1992 | Morehouse et al. | ......... | 248/632 |
| 5,223,996 A | 6/1993 | Read et al. | ................ | 360/97.02 |
| 5,402,308 A | 3/1995 | Koyanagi et al. | ........... | 361/685 |
| 5,469,311 A | 11/1995 | Nishida et al. | ........... | 360/97.02 |
| 5,510,954 A | 4/1996 | Wyler | ......................... | 361/685 |
| 5,645,262 A | 7/1997 | Hamlin | ...................... | 248/581 |
| 5,676,245 A * | 10/1997 | Jones | ......................... | 206/223 |
| 5,837,934 A | 11/1998 | Valavanis et al. | .......... | 174/52.1 |
| 5,894,932 A * | 4/1999 | Harding et al. | ............. | 206/583 |
| 5,967,327 A * | 10/1999 | Jones | ........................ | 206/583 |
| 6,005,768 A | 12/1999 | Jo | .............................. | 361/685 |
| 6,154,360 A | 11/2000 | Kaczeus, Sr. et al. | ....... | 361/685 |
| 6,222,121 B1 | 4/2001 | Cheng | ....................... | 174/52.1 |
| 6,311,844 B1 * | 11/2001 | Ridgeway et al. | .......... | 206/583 |
| 6,371,434 B1 * | 4/2002 | Becker et al. | ............... | 248/610 |
| 6,574,099 B2 | 6/2003 | Lindrose | ..................... | 361/685 |
| 6,920,981 B2 * | 7/2005 | Lofgren et al. | .............. | 206/583 |

FOREIGN PATENT DOCUMENTS

| | | |
|---|---|---|
| EP | 0866464 | 9/1998 |
| JP | 3083281 | 4/1991 |
| JP | 5342831 | 12/1993 |
| JP | 2001148186 | 5/2001 |
| JP | 2001216774 | 8/2001 |
| JP | 2002286072 | 10/2002 |
| JP | 2002334571 | 11/2002 |
| JP | 2002352575 | 12/2002 |

* cited by examiner

*Primary Examiner*—Jila M Mohandesi
(74) *Attorney, Agent, or Firm*—Zilka-Kotab, PC (57) ABSTRACT

A device for extending an event time of a physical shock imparted on an electronic device. The device includes a rigid or semi-rigid frame and a resiliently elastic material coupled to the frame, the resiliently elastic material suspending an electronic device with respect to the frame. The resiliently elastic material may be in the form of a sheet, a strap, a rib, and combinations thereof. One preferred resiliently elastic material is a polymeric material.

22 Claims, 7 Drawing Sheets

PROTECTIVE DEVICE FOR REDUCING THE IMPACT OF PHYSICAL SHOCK

FIELD OF THE INVENTION

The present invention relates to protective devices for electronics, and more particularly, this invention relates to structures for reducing the impact of physical shock.

BACKGROUND OF THE INVENTION

Electronic devices are found in all aspects of life. Of particular import are computers, which are found in homes and offices throughout the world. Computers are also being implemented more and more in machinery such as automobiles and aircraft. Further, it is now routine to ship computers and electronic components long distances, be it factory to retail outlet, factory to consumer, or warehouse to consumer.

One problem that continues to plague electronic devices is damage from physical shock. Physical shock can occur in many ways. During handling in a factory, retail store, or in a shipping warehouse, a component might be dropped. During transportation and for vehicle-mounted electronics, the vehicle carrying the electronic device might encounter potholes and other obstacles which jar the vehicle, translating the shock to the electronic device.

The problem caused by physical shock is even more pronounced in electronics having movable parts. For instance, hard disk drives (HDDs) have many moveable parts. A drop of four inches results in a shock of ~300 G (300 times the force of gravity) to an HDD. Shock can damage these delicate parts of the drive, such as the pivot bearing of the actuator, the motor and spindle bearings, the head resting on the load/unload components, electric components, etc.

These parts are even more susceptible to physical shocks caused by rough handling, transportation, and use in hostile environments. Conventional usage of a HDD has been fairly gentle with respect to operating environments. HDDs in the past have been associated with usage that is constrained to withstand shock events that are generally very mild. However, HDDs are now being implemented in more hostile environments, including laptops and even in vehicles.

Figure 1:
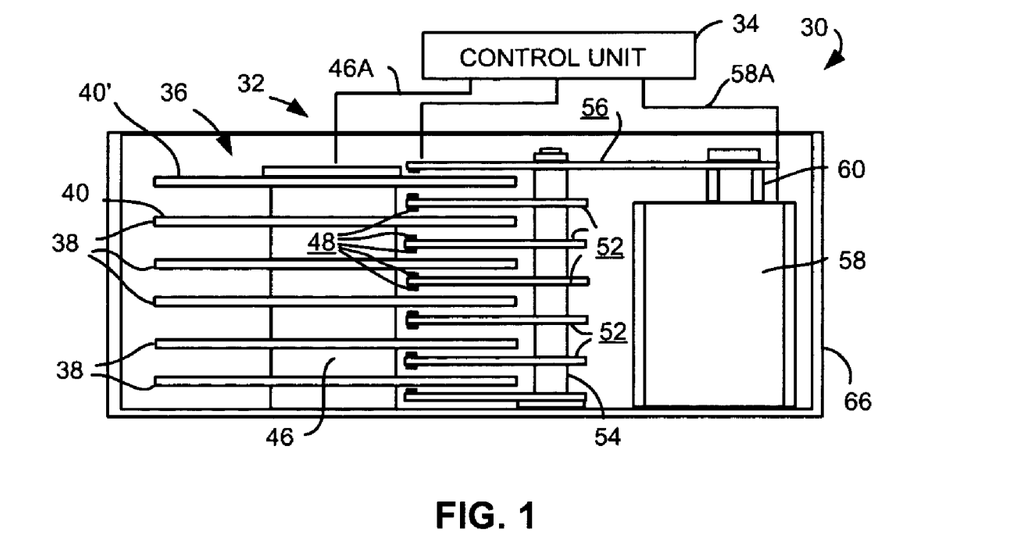
FIG. 1 is a schematic and simplified vertical sectional view of a rigid magnetic disk drive unit embodying the present invention.

FIG. 1 is a cross-sectional diagram of parts of a data storage disk drive system (HDD) 30 including a rigid magnetic disk drive unit generally designated as 32 and a control unit generally designated as 34. Unit 32 is illustrated in simplified form sufficient for an understanding of the present invention because the utility of the present invention is not limited to the details of a particular drive unit construction. After data storage disk drive system 30 is completely assembled, servo information used to write and read data is written using the disk drive system 30.

Figure 2:
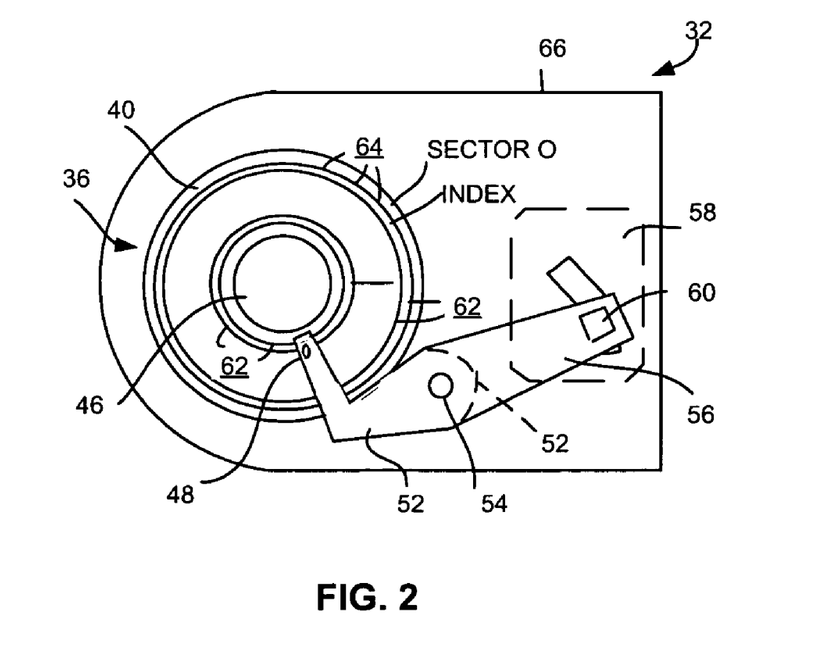
FIG. 2 is a top plan view of the structure shown in FIG. 1.

Referring now to FIGS. 1 and 2 of the drawing, disk drive unit 32 includes a stack 36 of disks 38 having two magnetic surfaces 40. The disks 38 are mounted in parallel for simultaneous rotation on and by an integrated spindle and motor assembly 46. Data information on each disk 38 are read and/or written to by a corresponding transducer head 48 movable across the disk surface 40. In a disk drive using a dedicated or hybrid servo, one of the disk surfaces 40' stores servo information used to locate information and data on the other disk surfaces 40.

Transducer heads 48 are mounted on flexure springs 50 carried by arms 52 ganged together for simultaneous pivotal movement about a support spindle 54. One of the arms 52 includes an extension 56 driven in a pivotal motion by a head drive motor 58. Although several drive arrangements are commonly used, the motor 58 can include a voice coil motor 60 cooperating with a magnet and core assembly (not seen) operatively controlled for moving the transducer heads 48 in synchronism in a radial direction in order to position the heads in registration with data information tracks or data cylinders 62 to be followed and access particular data sectors 64. Although a rotary actuator is shown, it should be understood that a disk drive with a linear actuator can be used. Data storage disk drive system 30 is a modular unit including a housing 66. The various components of the disk drive system 30 are controlled in operation by signals generated by control unit 34 such as motor control signals on line 46A and position control signals on line 58A.

Figure 3:
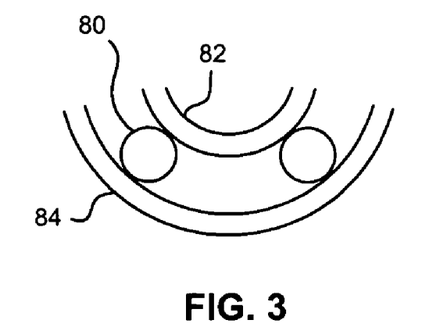
FIG. 3 is a partial view of a HDD spindle bearing mechanism.

As mentioned above, components of the HDD that are particularly susceptible to physical shock are the spindle bearing assemblies. FIG. 3 illustrates a detailed view of bearings 80 and races 82, 84. The bearings 80 rest against inner and outer races 82, 84. Because the bearings 80 are spherical, they only have one point of contact on each race 82, 84. The bearings 80 are much harder than the races 82, 84, so if a shock is inflicted, a bearing 80 will create a depression, or dent, in one or both races 82, 84. The race 82, 84 will scar and wear. Once a race 82, 84 has a scar, the drive will have a repeatable motion each time a bearing 80 contacts the scar. One result is a loud audible frequency noise. Another result is that the disk supported by the spindle will wiggle, resulting in operational instability.

Similar problems can also be found in other types of electronic devices, including CD and DVD players. Thus, the propensity for damage to electronics with moveable components presents a real problem.

Prior art attempts at reducing the damage inflicted by physical shock include surrounding the device in styrofoam or bubble wrap during shipping, and mounting sensitive components on rubber pads in the final device. However, these attempts provide only limited protection.

What is therefore needed is a new device that provides improved protection from physical shock.

SUMMARY OF THE INVENTION

The present invention overcomes the drawbacks and limitations described above by providing a device for extending an event time of a physical shock imparted on an electronic device. The device includes a rigid or semi-rigid frame and a resiliently elastic material coupled to the frame, the resiliently elastic material suspending an electronic device with respect to the frame.

The resiliently elastic material may be in the form of a sheet, a strap, a rib, and combinations thereof. One preferred resiliently elastic material is a polymeric material.

The electronic device may be sandwiched between layers of the resiliently elastic material. The electronic device may also be fixedly coupled to the resiliently elastic material.

With the proposed system the usage shock window can be expanded to allow a 2×, 4× or more increase in the amplitude of the shock environment with a corresponding increase in the shock event time. The proposed system allows HDDs and other electronics to be packaged in an elastic environment that will allow the HDD drives to be shock hardened for shipping and/or work in hostile environments.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The proposed invention makes use of a rigid or semi-rigid mounting frame and resiliently elastic membrane, sheet, strip or member to reduce the effects of physical shock associated with automotive, shipping, and other high impact environments on electronic devices. More particularly, the shock-proofing device makes use of a resiliently elastic membrane surrounding or coupled to the electronic device and fixed with respect to the sides of a rigid structure. Various embodiments of the present invention are set forth below in the "Examples" section.

While the embodiments described herein may be used for any type of electronic device or component, for simplicity and clarity, much of the following discussion shall refer to use with a HDD. The combination of the HDD and protective structure can be referred to as a shock hardened drive. The proposed system allows hard disk drives and other electronics to be packaged in an elastic environment that allows the HDD drives to be shock hardened for work in hostile environments.

Likewise, though any resiliently elastic material may be implemented in the present invention, the following description will refer to the preferred material, an elastomeric membrane.

The resiliently elastic membrane surrounding or coupled to the HDD serves to absorb the shock event and displace the energy dissipated from a short time event to a longer period of time. The longer the time the shock is imparted to the device, the less destructive the shock. With the proposed system the usage shock window can be expanded to allow a 2× to 4× (or more) increase in the amplitude of the shock environment with a corresponding increase in the shock event time.

Figure 4:
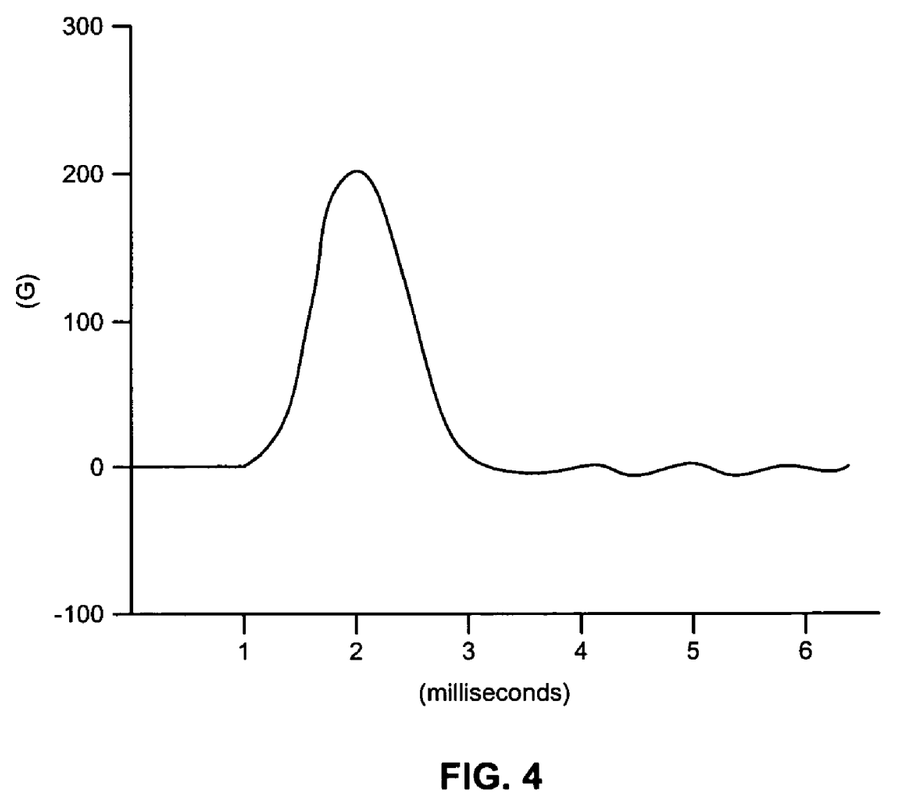
FIG. 4 is a chart illustrating a shock imparted on an unprotected device.

A typical shock event without a membrane shock hardening material is shown in FIG. 4. A non-shock hardened drive was exposed to an energy level of 290 G (290 times the force of gravity) at 1.6 milliseconds (msec). An on-board transducer was used to measure the resultant force and duration of the shock. As shown, the resultant shock was about 200 G, and the width of the shock pulse was about 2 msec. This is typical of physical shocks exerted on a drive in a computer (even with rubber footings), in standard shipping packaging (bubble wrap, foam, cardboard, drive taped to a frame, etc.), etc.

Figure 5:
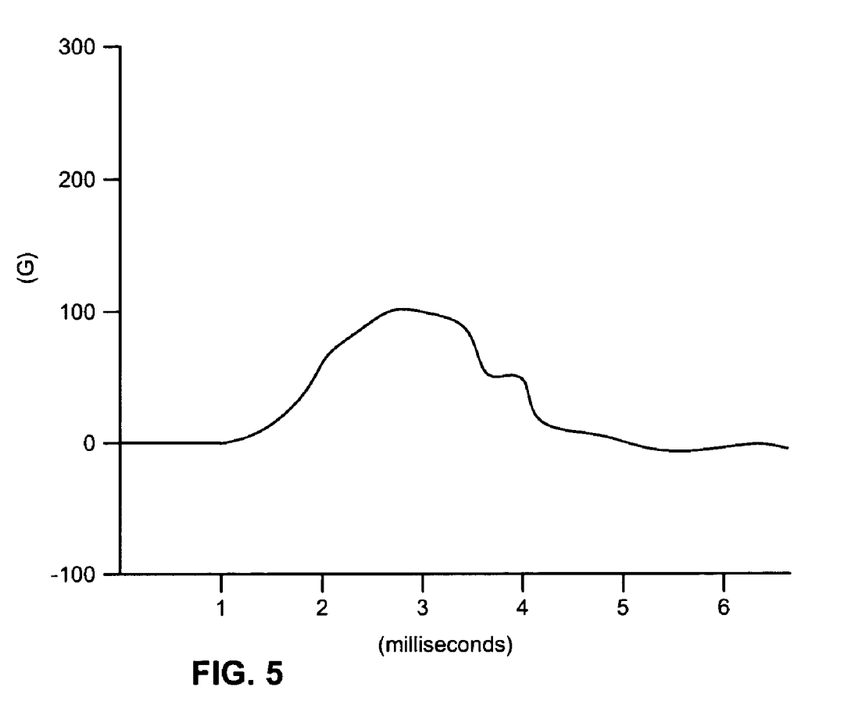
FIG. 5 is a chart illustrating a shock imparted on a device protected by the present invention.

In FIG. 5, the same drive with a shock-hardened packaging system according to one embodiment was exposed to the same shock and the energy level as was exerted FIG. 4. Since the drive is now protected from the shock event by the resiliently elastic membrane, the shock event experienced by the drive has now dissipated to 50% of the initial shock, transferring the energy over a greater period of time, i.e. 99.5 G for 4.6 msec.

A designer wishing to practice the invention can select the shock absorption characteristics of the protective mechanism as a function of one or more of the following parameters:

1. Thickness of the elastomeric material surrounding the HDD drive.
2. Elasticity of the elastomeric material material.
3. Tension of the structure comprised of the HDD drive surrounded by the elastomeric structure which is fixed to the sides of a rigid structure.
4. Rigidity of the sides of the structure.
5. Compression of the mount.

Depending on the environment that the HDD drive will be operating in, the shock absorption of the entire structure can be designed to preferably withstand a 2:1 to 4:1 increase in shock compared to no shock hardening. If a car environment is desired, then a very shock-hardening structure can be designed. If the environment is a home system, then a more mild system can be designed. Thus, the overall design features of shock-hardening can be determined a function of the shock hostility of the final operating environment.

Preferred materials from which to form the resiliently elastic membrane include organic polymer plastic of 2 mils thickness or more. Many polymer plastic materials are suitable, though polypropylene and low density polyethylene are preferred. The following table lists several suitable materials and selected properties thereof.

TABLE 1

| Material | Modulus (GN/m^2) | Tensile Strength N/mm^2 | Elongation (%) at break |
|---|---|---|---|
| Polyethylene HD | 1.7 | 20-30 | 20-100 |
| Polyethylene LD | 0.7 | 9-15 | 100-650 |
| Polypropylene | 1.3 | 27 | 200-700 |
| Polyethylene HD Ethylene Copolymer | 1.4 | 10-18 | 600-700 |
| Polyethylene LD and Ethylene Copolymer | 0.8 | 12 | 740 |

Other examples of suitable materials include vinyl, rubber, latex, elastic, etc.

EXAMPLES

The following illustrative embodiments describe several possible permutations of the present invention.

Drive Mount—Computer, Vehicle, etc.

Figure 6A:
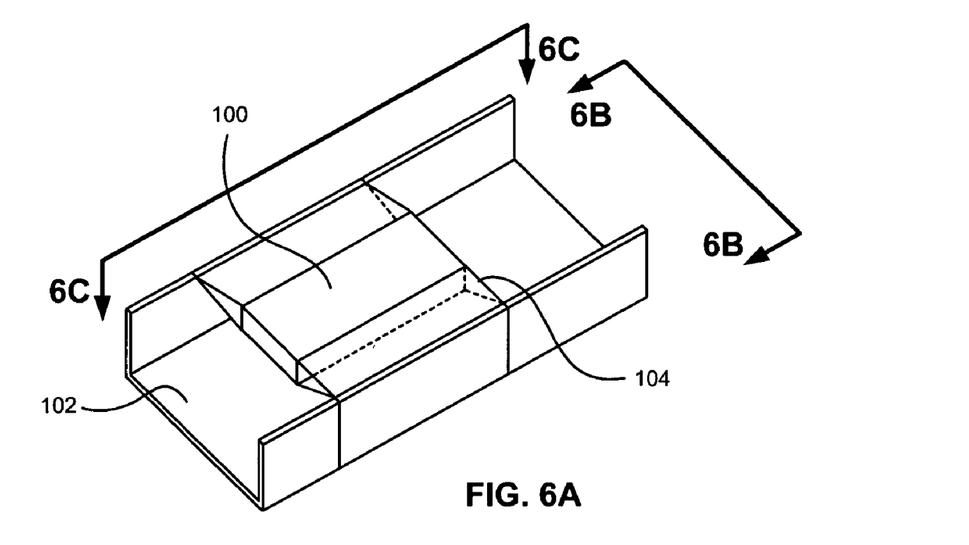
FIG. 6A is a perspective view of an embodiment of the present invention using a membrane.
Figure 6B:
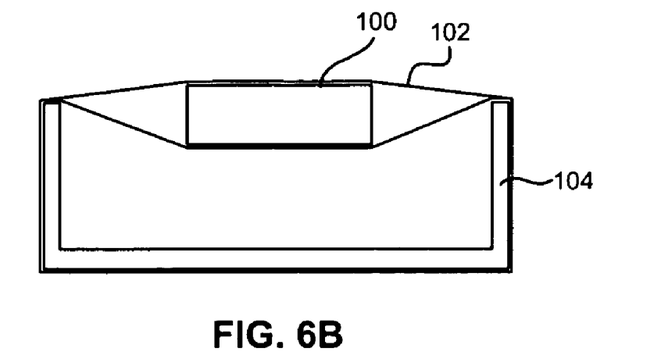
FIG. 6B is a side view of the embodiment of FIG. 6A taken along line 6B-6B of FIG. 6A.
Figure 6C:
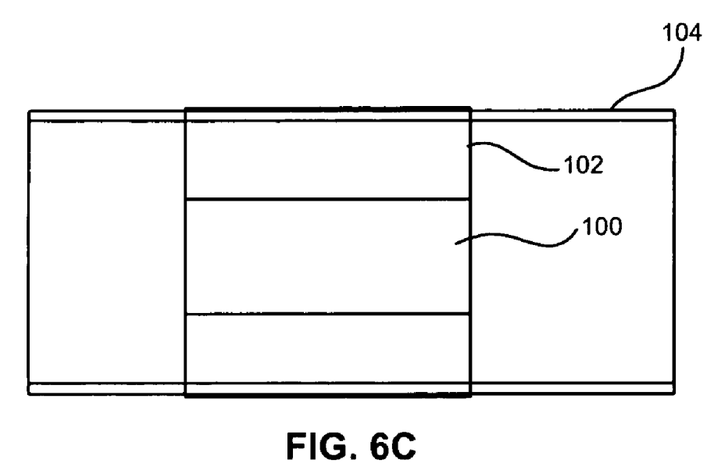
FIG. 6C is a side view of the embodiment of FIG. 6A taken along line 6C-6C of FIG. 6A.

FIGS. 6A-B illustrate an embodiment suitable for mounting a HDD in a computer, rack, vehicle, etc. As shown, the HDD 100 is mounted in a frame 102 and suspended between ends of the frame 102 by a membrane 104. The membrane 104 is wrapped once around the frame 102, the HDD 100 is placed on the membrane 104, and the membrane 104 is wrapped around the frame 102 again, thereby sandwiching the HDD 100 between layers of the membrane 104. The membrane dimensions can be similar to those of the HDD housing, larger, or smaller. Also, the membrane 104 may be wrapped more than twice. An adhesive or other coupling may be used to couple the HDD 100 to one or more of the membrane layers to reduce or eliminate slippage of the HDD 100.

Polymeric materials expand when heated according to their coefficient of thermal expansion. To accommodate varying thermal conditions, the distance between the HDD housing and the frame can be extended for safety so that the drive will not hit the frame 102 even under high heat conditions. For example, if the membrane 104 is expected to expand by 2 mm at 150° F., the distance between the HDD housing and each frame 102 can be made 4 mm so that it is very unlikely that the HDD 100 will hit the frame 102 during a shock.

Figure 7:
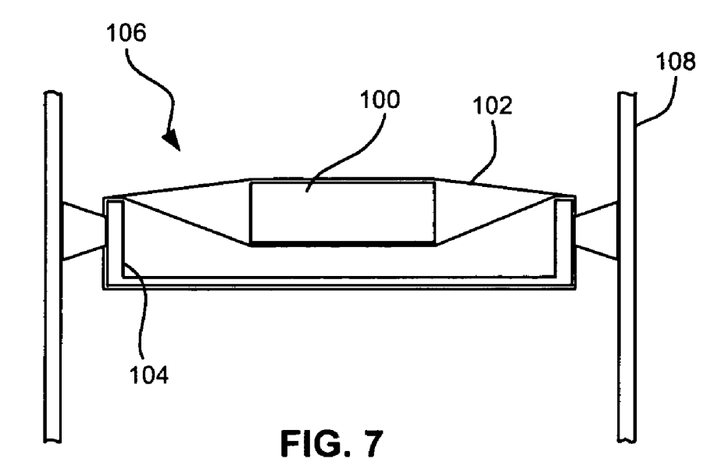
FIG. 7 is a side view of an alternate embodiment where the frame is an integral part of a computer.

FIG. 7 illustrates an alternate embodiment, where the frame 102 is an integral part of a computer 108, such as a drive bay 106. The membrane 104 is wrapped around the drive bay 106 once, the HDD 100 is placed on the membrane 104, and the membrane 104 is wrapped around the drive bay 106 again, thereby sandwiching the HDD 100 between layers of the membrane 104.

Shipping Packaging

Figure 8:
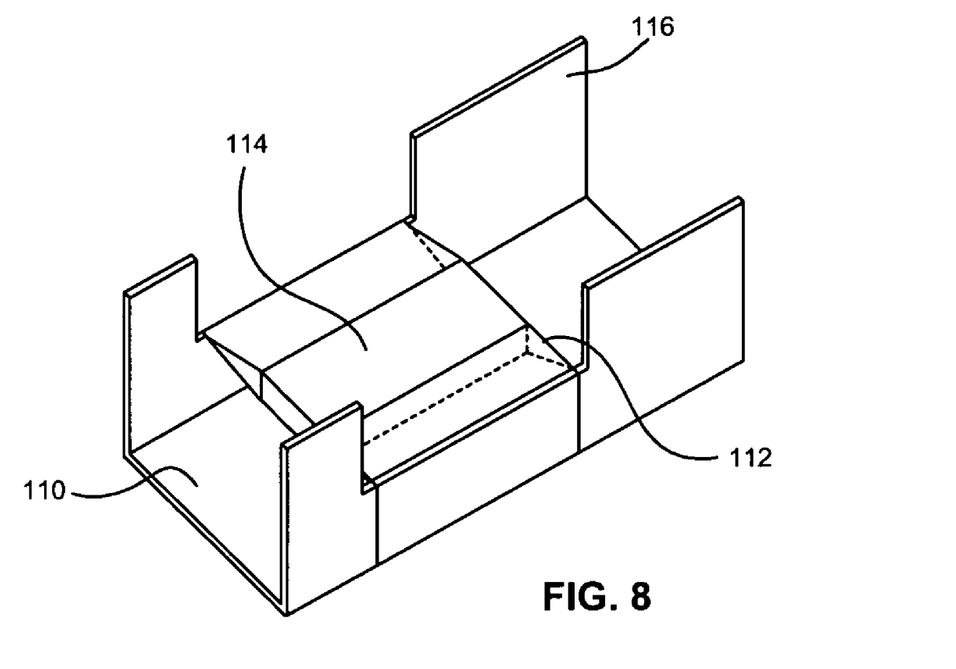
FIG. 8 is a perspective view of an embodiment that can be used for shipping electronics.

FIG. 8 illustrates an embodiment that can be used for shipping electronics such as a HDD. This embodiment implements a U-shaped resilient frame 110 (e.g., cardboard) and membrane 112 that suspends the HDD 114. Protruding portions 116 of the frame 110 keep the HDD 114 from contacting the packaging (e.g., box, bag, etc.) used for shipping.

Parallel Straps

Figure 9A:
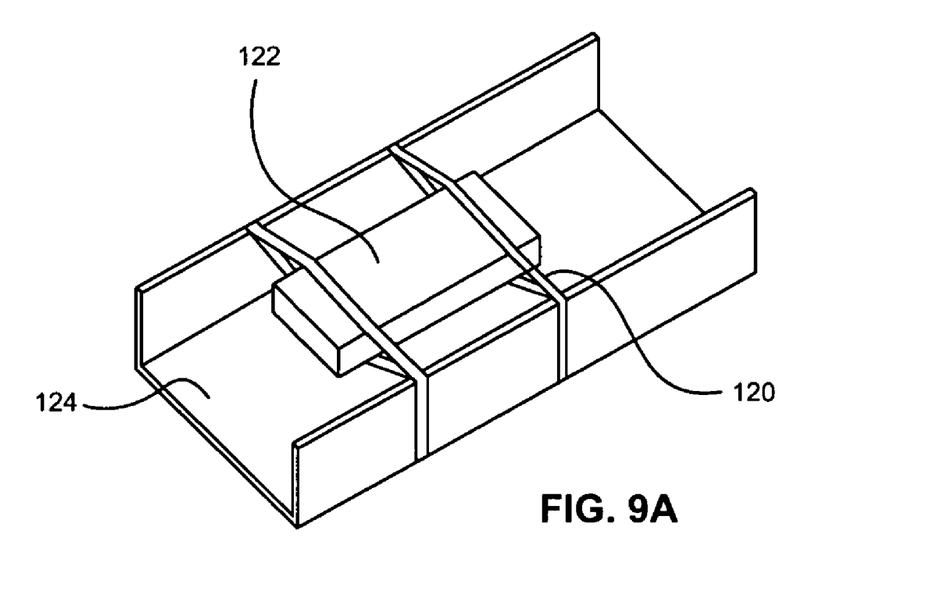
FIG. 9A is a perspective view of an embodiment of the present invention using straps.
Figure 9B:
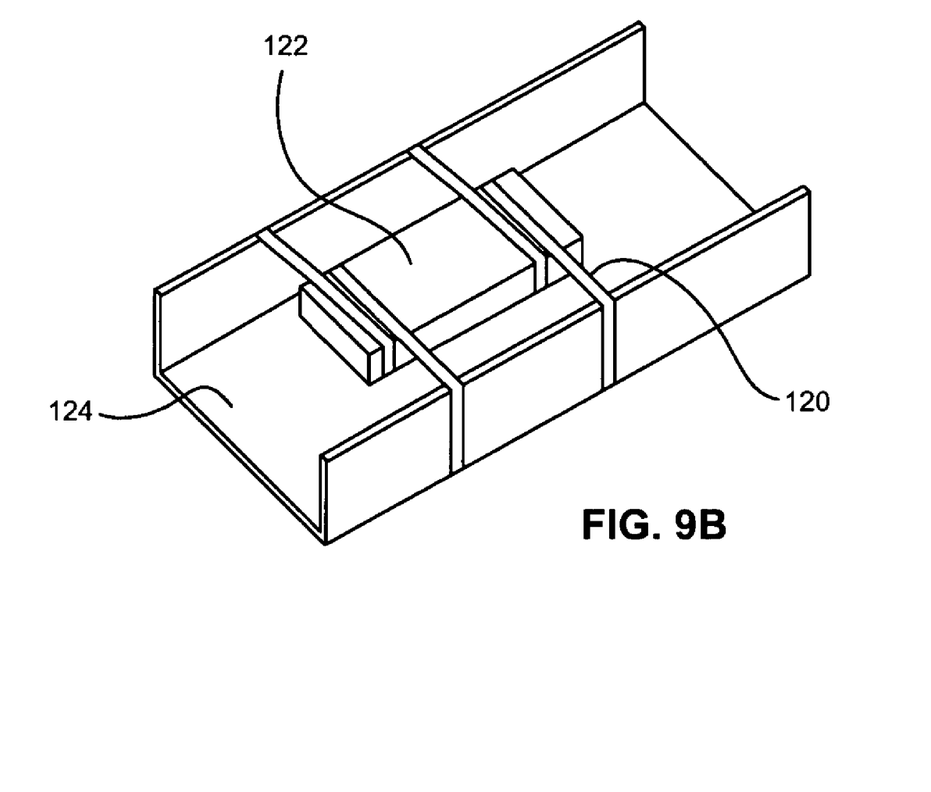
FIG. 9B is a perspective view of another embodiment of the present invention using straps.

As a variation on the above embodiments, a number of straps can be used to suspend the drive. As shown in FIG. 9A, two straps 120 are positioned at opposite ends of the HDD 122 to support the HDD 122 with respect to the frame 124. Note that more straps may be used. As shown in FIG. 9B, the straps 120 are wrapped around the HDD 122.

Cross Straps

Figure 10:
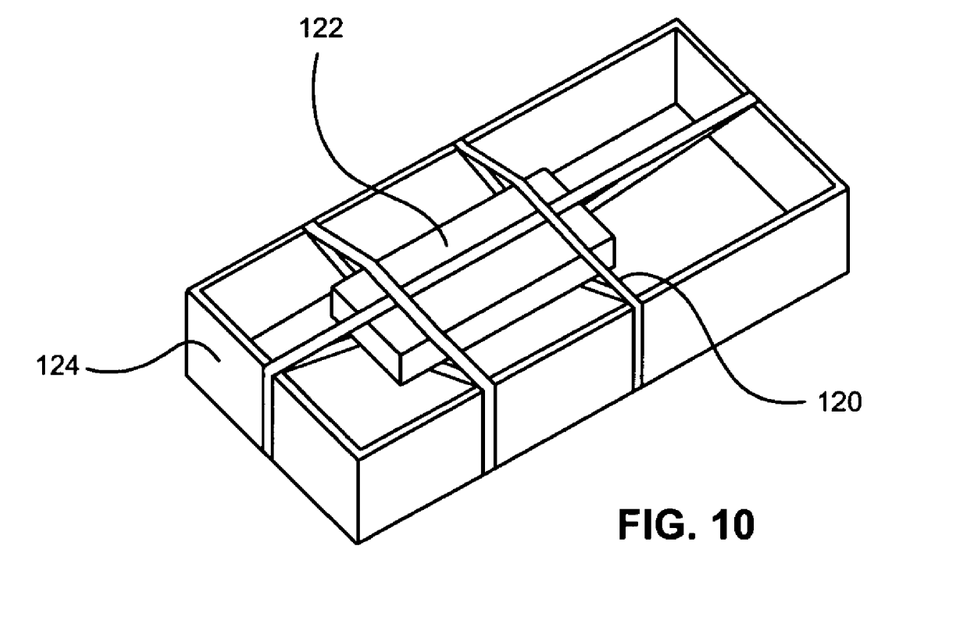
FIG. 10 is a perspective view of an embodiment of the present invention using cross straps.

In another variation on the above embodiments, shown in FIG. 10, cross straps 120 can be used with a frame to suspend the HDD 122, where various straps 120 intersect each other at some angle, e.g., 90°, 45°, etc.

Single Layer Membrane or Strap

In yet another variation, an adhesive or adhesive tape is used to couple the HDD to the membrane or straps. Thermal bonding can also be used. This would increase heat transfer from the HDD housing, as more of the HDD housing would be exposed to ambient air.

Multiple Plies

Another variation on the above embodiments uses multiple plies of the membrane or straps. This reduces chance of membrane coming loose from the frame. This also allows use of thinner polymer films.

Multiple Materials

Different materials having different elasticities can be used in combination. If the forces imparted on the drive are expected to be more powerful in one direction than the other, can use a softer material on the side expected to dampen more shock. For example, in a laptop, shocks will typically be more forceful towards the bottom of the laptop due to setting the laptop on a desk. Thus, the greater force will be exerted in the down direction, so a softer material can be used on the bottom of the drive to provide more damping in the down direction, with less "give" in the upper direction to prevent the drive from striking the upper side of the laptop drive bay.

Ribs as Support

Figure 11:
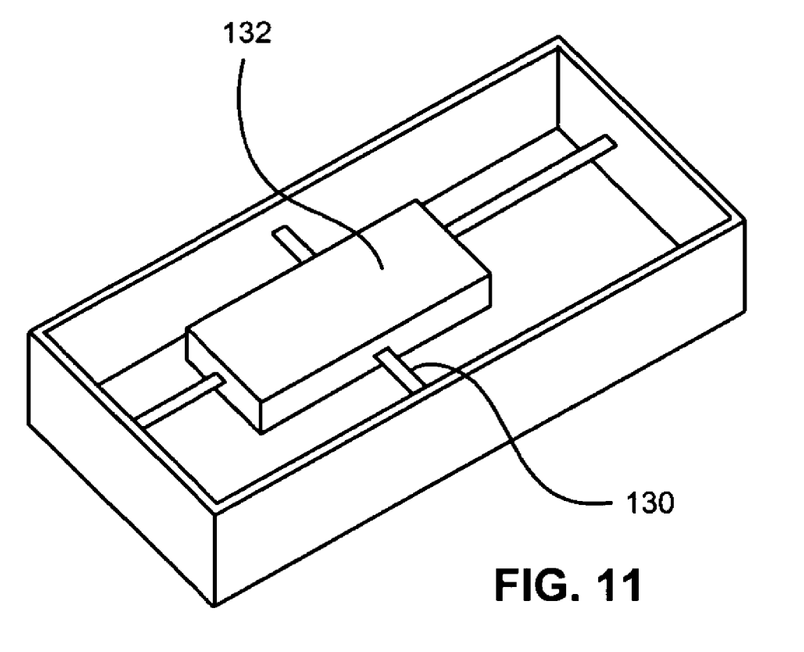
FIG. 11 is a perspective view of an embodiment of the present invention using ribs.

FIG. 11 illustrates an embodiment in which ribs 130 are coupled to opposite ends of the HDD 132 to support the HDD 132 in a similar way as the membrane. The ribs 130 are constructed of a resiliently elastic material, and can be the same material as the membrane. Preferably, the ribs are in tension.

Rib to Reduce Movement

Figure 12:
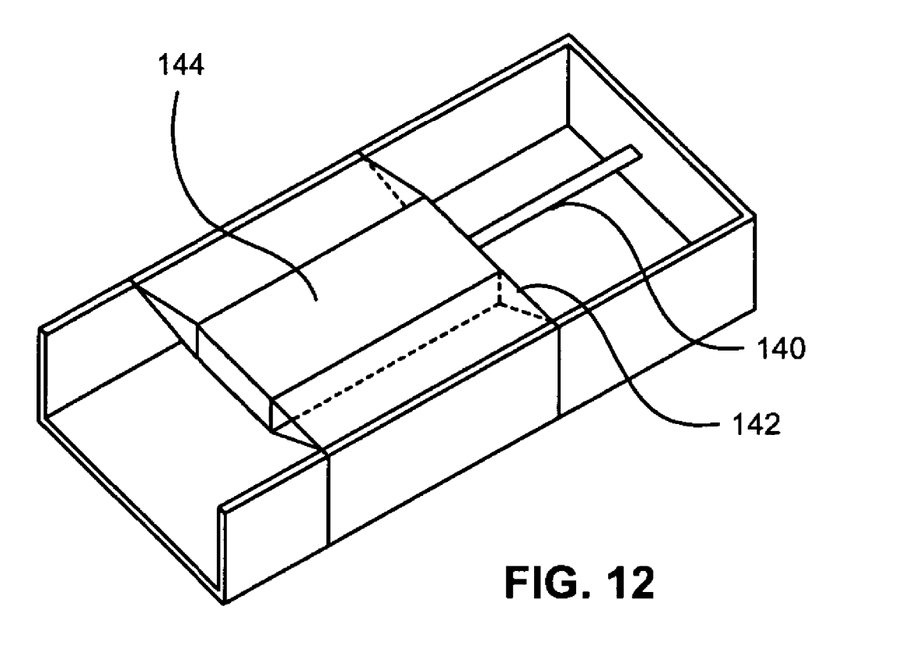
FIG. 12 is a perspective view of an embodiment of the present invention using a membrane and a rib.

FIG. 12 illustrates use of one or more ribs 140 in combination with a membrane 142. The rib 140 can be used to counter the effects of gravity and vertical/horizontal shock, preventing the HDD 144 from moving. This is particularly useful for vertically-mounted drives and where the membrane is oriented vertically along the drive housing. The ribs 140 would also be constructed of a resiliently elastic material, and can be the same material as the membrane 142.

Components of the various embodiments described herein can be mixed and matched with any other components to obtain the desired results. Again, it should be emphasized that the various embodiments can be used with any type of electronic device, such as a CD player, HDD, an entire computer, etc.

While various embodiments have been described above, it should be understood that they have been presented by way of example only, and not limitation. For example, the structures and methodologies presented herein are generic in their application to all electronic devices. Thus, the breadth and scope of a preferred embodiment should not be limited by any of the above-described exemplary embodiments, but should be defined only in accordance with the following claims and their equivalents.

What is claimed is:

1. A device for extending an event time of a physical shock imparted on an electronic device, comprising:
   a frame; and
   a resiliently elastic material coupled to the frame, the resiliently elastic material being adapted for suspending an electronic device with respect to the frame and holding the electronic device away from a base of the frame,
   wherein a portion of the frame is positioned along at least three sides of the electronic device,
   wherein at least a portion of the resiliently elastic material is wrapped around an entire length of an outer periphery of the portion of the frame such that the resiliently elastic material encircles the outer periphery of the portion of the frame,
   wherein the resiliently elastic material forms a complete loop around the portion of the frame.

2. A device as recited in claim 1, wherein the portion of the frame located along the at least three sides of the electronic device is a unitary structure.

3. A device as recited in claim 1, wherein the frame is at least one of rigid and semi-rigid.

4. A device as recited in claim 1, wherein the resiliently elastic material is a polymeric material.

5. A device as recited in claim 1, wherein the resiliently elastic material is in the form of a sheet.

6. A device as recited in claim 1, wherein the resiliently elastic material is in the form of a strap.

7. A device as recited in claim 1, wherein the resiliently elastic material is in the form of a rib adapted to be coupled to an electronic device.

8. A device as recited in claim 7, wherein the rib is in tension.

9. A device as recited in claim 1, further comprising layers of the resiliently elastic material adapted to sandwich an electronic device therebetween.

10. A device as recited in claim 9, further comprising at least one rib coupled to the frame and adapted for coupling to an electronic component for further restricting movement of the electronic component with respect to the frame.

11. A device as recited in claim 1, wherein the resiliently elastic material is adapted for physical coupling to an electronic device.

12. A device as recited in claim 1, wherein the device extends a shock event time imparted on an electronic device coupled thereto by at least twice with respect to an identical shock imparted on an identical unprotected electronic device.

13. A device as recited in claim 1, wherein the device extends a shock event time imparted on an electronic device coupled thereto by at least four times with respect to an identical shock imparted on an identical unprotected electronic device.

14. A device as recited in claim 1, wherein the device is designed for coupling to a hard disk drive.

15. An electronic device in combination with a device for extending an event time of a physical shock imparted on the electronic device, comprising:

an electronic device;

a frame having a base and at least two sides; and an elastic material coupled to the frame, the elastic material being wrapped around at least a portion of the frame such that the elastic material forms an effectively continuous single loop around an outer periphery of the frame located there along and the electronic device, wherein the elastic material suspends the electronic device away from the base of the frame.

16. An electronic device in combination with a device for extending an event time of a physical shock imparted on the electronic device as recited in claim 15, wherein the elastic material is in the form of a sheet.

17. An electronic device in combination with a device for extending an event time of a physical shock imparted on the electronic device as recited in claim 15, wherein the elastic material is in the form of a strap.

18. An electronic device in combination with a device for extending an event time of a physical shock imparted on the electronic device as recited in claim 15, further comprising at least one rib coupled to the frame and the electronic device for further restricting movement of the electronic device with respect to the frame.

19. An electronic device in combination with a device for extending an event time of a physical shock imparted on the electronic device as recited in claim 15, wherein the electronic device is fixedly coupled to the elastic material.

20. An electronic device in combination with a device for extending an event time of a physical shock imparted on the electronic device as recited in claim 15, wherein the shock event time is extended by at least twice with respect to an identical shock imparted on an identical unprotected electronic device.

21. An electronic device in combination with a device for extending an event time of a physical shock imparted on the electronic device as recited in claim 15, wherein the shock event time is extended by at least four times with respect to an identical shock imparted on an identical unprotected electronic device.

22. An electronic device in combination with a device for extending an event time of a physical shock imparted on the electronic device as recited in claim 15, wherein the electronic device is a hard disk drive.

* * * * *